E. S. ROBINSON.
STEERING GEAR FOR AUTOMOBILES.
APPLICATION FILED MAY 24, 1913.
1,092,745.
Patented Apr. 7, 1914.
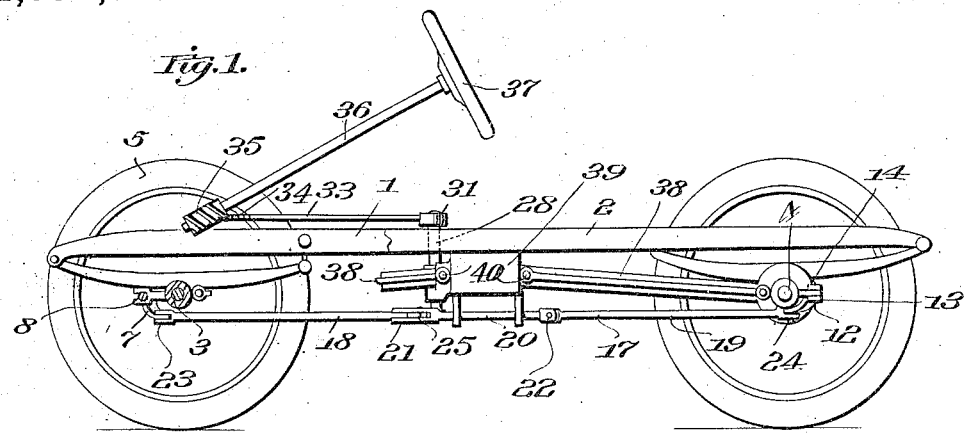
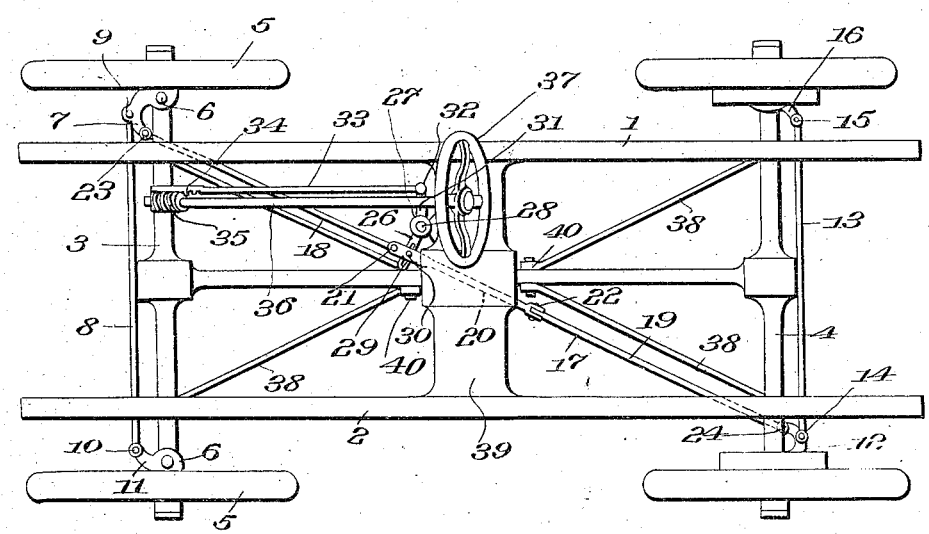
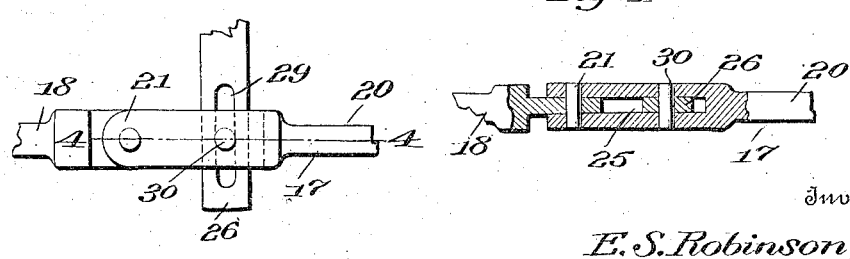
Witnesses
Inventor
E. S. Robinson,
By Victor J. Evans
Attorney

UNITED STATES PATENT OFFICE.

EDWARD S. ROBINSON, OF OROVILLE, CALIFORNIA, ASSIGNOR TO GOLDEN WEST MOTORS COMPANY, OF SACRAMENTO, CALIFORNIA, A CORPORATION OF CALIFORNIA.

STEERING-GEAR FOR AUTOMOBILES.

1,092,745.  Specification of Letters Patent.  Patented Apr. 7, 1914.

Application filed May 24, 1913. Serial No. 769,660.

*To all whom it may concern:*

Be it known that I, EDWARD S. ROBINSON, a citizen of the United States, residing at Oroville, in the county of Butte and State of California, have invented new and useful Improvements in Steering-Gears for Automobiles, of which the following is a specification.

This invention relates to a form of steering gear which is adapted especially for use upon a motor vehicle having a pair of propulsion axles with the wheel of each axle mounted upon steering spindles, the primary object being to provide steering gear of simple and durable construction which will be positive and efficient in operation.

The invention consists in the features of construction, combination and arrangement of parts, hereinafter fully described and claimed, reference being had to the accompanying drawing, in which:

Figure 1 is a fragmentary side elevation of the chassis of an automobile constructed in accordance with the invention; Fig. 2 is a top plan view of the same; Fig. 3 is a detail top plan view of the joint between sections of the main steering rod showing the manner in which the operating lever is connected therewith, the latter being broken away; and, Fig. 4 is a sectional view on line 4—4 of Fig. 3.

In the drawing, the numerals 1 and 2 designate the parallel side members of the frame to which the front and rear axles 3 and 4 are connected in any suitable manner. These axles are both adapted for propulsion and it is to be understood that the wheels 5 mounted upon the pivoted steering spindles 6 of the said axles are connected by means of a knuckle-joint or the like (not shown) with the propelling mechanism (also not shown).

The right hand spindle 6 of the front axle is provided with a forwardly and inwardly curved arm 7 and a transversely extending connecting equalizing rod 8 has its adjacent extremity medially pivoted to the arm 7 by means of the vertical pivot pin 9, its opposite extremity being pivotally connected by means of the vertical pivot pin 10 with the end of a forwardly and inwardly projecting arm 11 provided upon the left hand spindle of the said axle. A rearwardly and inwardly curved arm 12 is provided on the left hand spindle of the rear axle 3 and a transversely extending connecting equalizing rod 13 has its adjacent end medially pivoted to the said arm by means of the vertical pivot pin 14. The opposite end of this rod 13 is connected by means of the vertical pivot pin 15 with the end of a rearwardly and inwardly inclined arm 16 provided on the right hand spindle of the latter axle. A main steering rod 17 extends diagonally through a medial point in the frame and includes the front and rear sections 18 and 19 and the intermediate section 20 whose terminals are connected to the adjacent ends of the end sections by means of the knuckle joints 21 and 22 one of which embodies a vertical pivot and the other a horizontal pivot. The front and rear ends of the steering rod 17 are pivotally connected by means of the vertical pivot pins 23 and 24 with the ends of the right hand and left hand spindle arms 7 and 12 respectively of the front and rear axles. The forward terminal of the intermediate section 20 of the steering rod 17 is provided with a longitudinal slot 25 opening through its side faces, and the innermost arm 26 of a horizontally movable operating lever 27, which is pivotally mounted upon the vertical pivot shaft 28 carried by the frame adjacent its medial point, extends through the said slot 25 for slidable movement therein and is provided with a longitudinally extending slot 29 for the reception of the vertically disposed limiting pin 30, which latter extends vertically through the slot 25 in the said intermediate steering rod section. The opposite, longer arm 31 of the operating lever is pivotally connected as at 32 to the rear end of a forwardly extending reach or yoke bar 33, the forward end of the latter being provided with a toothed rack 34 for engagement with the worm gear 35 provided upon the lower end of the steering shaft 36, to the upper end of which the usual hand wheel 37 is attached.

Radially extending brace bars 38 extend from the medial portion 39 of the frame to their outer points of connection with the respective axles adjacent to their spindles. These brace bars have their inner ends preferably connected in a detachable manner as at 40 to the said medial portion of the frame and have their outer ends connected in similar manner to the said axles, so that any one of these rods may be replaced in the event that it becomes broken from any cause. The brace bar connecting the rear axle with the medial portion of the frame and which is positioned on the left side of the frame is disposed inwardly with respect to the section 19 of the main steering rod 17 and parallel thereto, and the brace bar connecting the said frame portion with the front axle is disposed on the right side of the frame with respect to the section 18 of the steering rod and in parallel relation to the same. It should therefore be apparent that these particular brace rods will serve to reinforce the frame structure and to prevent distortion of the same which would otherwise be caused by the exertion of considerable force upon the diagonally extending steering rod 17. The other brace bars serve to equalize the strain upon the frame by the transverse pull upon the respective axle spindles caused by the connecting rods 8 and 13.

From the foregoing description, taken in connection with the accompanying drawing, it should be apparent that, when the steering wheel 37 is operated in either direction, the reach bar 33 will cause the desired oscillation of the operating lever 27, whereupon the steering rod 17 will be given longitudinal thrust in the proper direction, and the axle spindles will be turned as a result thereof in the desired direction to cause the vehicle to be steered at the will of the operator. The construction set forth renders the steering gear positive in action and very durable so that it and the frame to which the axles are attached will stand the strains to which they will be subjected by hard usage. It is to be understood, however, that minor changes in the details of construction may be resorted to in practice without departing from the scope of the invention.

Having thus described my invention, what I claim is:

1. In four wheel steering mechanism, steering knuckles at the extremities of both the front and rear axles, a knuckle arm on each knuckle, front and rear equalizing rods respectively connecting the front knuckle arms and the rear knuckle arms, a yoke rod extending diagonally of the machine frame connecting a right hand knuckle arm of one axle and a left hand knuckle arm of the other axle, a two armed lever one arm of which has a jointed connection with said yoke rod, a rod attached to the other arm of said lever and provided with a toothed face, a steering shaft, a gear wheel on said shaft meshing with said toothed face, and a hand control steering wheel on said shaft.

2. In a device of the class described, the combination with a frame, front and rear propulsion axles attached to the frame and provided with movable steering spindles, and wheels mounted upon said spindles, of forwardly projecting arms carried by the spindles of the front axle, a transversely movable connecting rod having its ends pivotally connected to the said arms, rearwardly projecting arms provided on the spindles of the rear axle, a connecting rod having its ends pivotally connected to the last named arms, a diagonally extending yoke rod connecting the right hand knuckle arm of one axle and the left hand knuckle arm of the other axle and passing through a medial portion of the frame, said yoke rod including end sections the outer ends of which are pivotally connected with the last named knuckle and an intermediate section arranged in alinement with the end sections of the steering rod and having one end pivoted to the inner end of the adjacent end rod by means of a horizontal pivot and its other end pivoted to the opposite end rod by means of a vertical pivot, a horizontally movable operating lever pivoted to the frame and having one of its arms connected with the end of the intermediate steering rod section by means of a vertical pivot, and means by which the said lever may be operated.

In testimony whereof I affix my signature in presence of two witnesses.

EDWARD S. ROBINSON.

Witnesses:
FRANK G. MOONEY,
K. M. ROBINSON.

---

Copies of this patent may be obtained for five cents each, by addressing the "Commissioner of Patents, Washington, D. C."